(12) United States Patent
Yoon

(10) Patent No.: US 12,397,348 B2
(45) Date of Patent: Aug. 26, 2025

(54) COMPOSITE FOR POROUS TRANSPORT LAYER, SINTERED BODY THEREOF, AND METHOD FOR PREPARING THE SAME

(71) Applicants: HYUNDAI MOTOR COMPANY, Seoul (KR); KIA CORPORATION, Seoul (KR)

(72) Inventor: Dae Il Yoon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 643 days.

(21) Appl. No.: 17/375,344

(22) Filed: Jul. 14, 2021

(65) Prior Publication Data

US 2022/0339702 A1    Oct. 27, 2022

(30) Foreign Application Priority Data

Apr. 23, 2021    (KR) ........................ 10-2021-0053329

(51) Int. Cl.
*B22F 9/16*    (2006.01)
*B22F 1/10*    (2022.01)
(Continued)

(52) U.S. Cl.
CPC ................. *B22F 9/16* (2013.01); *B22F 1/10* (2022.01); *B22F 3/1103* (2013.01); *C25B 1/04* (2013.01);
(Continued)

(58) Field of Classification Search
CPC ........... C25B 11/032; C25B 9/19; C25B 9/40; C25B 1/04; C25B 11/061; C25B 11/063; B22F 1/10; B22F 3/1103; H01M 4/667; H01M 4/8621; H01M 4/8663; H01M 4/8807; H01M 8/0232; H01M 8/0241; H01M 8/0245
(Continued)

(56) References Cited

U.S. PATENT DOCUMENTS 6,933,259 B2    8/2005    Hatanaka et al.
2002/0090512 A1    7/2002    Hatanaka et al.
(Continued)

FOREIGN PATENT DOCUMENTS

DE    102010029502 A1 * 12/2011 ............... C23C 4/11
JP    4006976 B2    11/2007
(Continued)

OTHER PUBLICATIONS

Yasutake et al., Catalyst-Integrated Gas Diffusion Electrodes for Polymer Electrolyte Membrane Water Electrolysis: Porous Titanium Sheets with Nanostructured TiO2 Surfaces Decorated with Ir Electrocatalysts, Sep. 20, 2020, Journal of the Electrochemical Society, 167, all (Year: 2020).*

*Primary Examiner* — Jonathan G Leong
*Assistant Examiner* — John S Medley
(74) *Attorney, Agent, or Firm* — MORGAN, LEWIS & BOCKIUS LLP

(57) ABSTRACT

A composite for a porous transport layer may include a particulate substrate including at least one selected from a group consisting of an oxide of a first metal and a second metal, and nanoparticles of a third metal formed on a surface of the particulate substrate, a sintered body thereof, and a method for preparing the same.

3 Claims, 9 Drawing Sheets

(51) Int. Cl.
  *B22F 3/11* (2006.01)
  *C25B 1/04* (2021.01)
  *C25B 9/19* (2021.01)
  *C25B 9/40* (2021.01)
  *C25B 11/032* (2021.01)
  *H01M 4/66* (2006.01)
  *H01M 4/86* (2006.01)
  *C25B 9/77* (2021.01)

(52) U.S. Cl.
  CPC .................. *C25B 9/19* (2021.01); *C25B 9/40* (2021.01); *C25B 11/032* (2021.01); *H01M 4/667* (2013.01); *H01M 4/8621* (2013.01); *H01M 4/8663* (2013.01); *B22F 2301/205* (2013.01); *B22F 2302/25* (2013.01); *C25B 9/77* (2021.01)

(58) Field of Classification Search
  USPC ......................................................... 429/485
  See application file for complete search history.

(56) References Cited

U.S. PATENT DOCUMENTS

| | | | |
|---|---|---|---|
| 2006/0078784 A1* | 4/2006 | Liu | H01M 4/8807 429/480 |
| 2011/0114496 A1* | 5/2011 | Dopp | H01M 4/8631 204/290.01 |
| 2015/0118594 A1* | 4/2015 | Liu | H01M 8/0239 429/480 |
| 2019/0379060 A1 | 12/2019 | Yano et al. | |
| 2020/0251747 A1* | 8/2020 | Lee | H01M 4/8878 |
| 2021/0164109 A1* | 6/2021 | Höller | H01M 8/0245 |
| 2022/0085390 A1* | 3/2022 | Buechi | C25B 9/77 |

FOREIGN PATENT DOCUMENTS

| | | | | |
|---|---|---|---|---|
| JP | 4817218 | B2 | 11/2011 | |
| JP | 2013243119 | A * | 12/2013 | ............ B01J 23/648 |
| JP | 6372586 | B1 | 7/2018 | |
| KR | 10-1564608 | B1 | 11/2015 | |
| WO | WO-2020020467 | A1 * | 1/2020 | ............ C23C 24/087 |
| WO | WO-2020151997 | A1 * | 7/2020 | ............ C25B 1/042 |

* cited by examiner

COMPOSITE FOR POROUS TRANSPORT LAYER, SINTERED BODY THEREOF, AND METHOD FOR PREPARING THE SAME

CROSS-REFERENCE TO RELATED APPLICATION

The present application claims priority to Korean Patent Application No. 10-2021-0053329, filed on Apr. 23, 2021, the entire contents of which is incorporated herein for all purposes by this reference.

BACKGROUND OF THE INVENTION

Field of the Invention

The present invention relates to a composite for a porous transport layer which may be sintered even at a relatively low temperature, a sintered body of the composite having excellent mechanical strength and structural stability, and a method for preparing the same.

Description of Related Art

A polymer electrolyte membrane (PEM) water electrolysis system is an electrochemical conversion device that decomposes water ($H_2O$) into hydrogen ($H_2$) and oxygen ($O_2$) using electricity. The PEM water electrolysis system may operate at a high current density, has a high response speed to compensate for a power fluctuation amount of intermittent renewable energy such as wind power, solar power, and the like, and has a low gas permeability through a solid electrolyte membrane to enable preparation of high purity hydrogen and oxygen and to have a high stability. Such PEM water electrolysis system is composed of a PEM water electrolysis stack and a peripheral device configured for driving the PEM water electrolysis stack, and the PEM water electrolysis stack is composed of a number of PEM water electrolysis cells.

In the present connection, referring to FIG. 1, the PEM water electrolysis cell generally includes a membrane-electrode assembly (MEA) including an electrolyte membrane 10, an anode 20, and a cathode 30, a gas diffusion layer (GDL) 40 for the cathode, a porous transport layer (PTL) 50 for the anode, a separator 60 for the cathode, and a separator 70 for the anode. In the present connection, the anode 20 is supplied with water introduced through a separator flow path "a" for the anode through the PTL, and hydrogen gas generated in the cathode 30 is discharged through the GDL and a separator flow path "b" for the cathode. In an electrochemical reaction of such PEM water electrolysis cell, after the water supplied to the anode is separated into hydrogen ions ($H^+$) and electrons together with oxygen gas by an oxygen evolution reaction (OER), the hydrogen ions ($H^+$) and the electrons move to the cathode respectively through the electrolyte membrane and an external circuit, and produce the hydrogen gas by a hydrogen evolution reaction.

The PTL is configured to uniformly distribute and/or diffuse the water, which is a reactant, to a surface of the anode, discharge oxygen generated from the anode to the outside through the separator, and collect and/or deliver electrons generated by the electrochemical reaction. To maximize such functions of the PTL, various physical properties such as a corrosion resistance, an electrical conductivity, a distributivity and a diffusivity, a low surface roughness, a mechanical strength, and the like are essential.

The PTL is typically divided into a sintered fiber type and a sintered powder type. The sintered fiber type has a low electrical conductivity as a contact area with a catalyst layer is small, and has pores having a relatively large and non-uniform size. Thus, distribution and diffusion of the water, and removal of the generated oxygen are not easy. Furthermore, because of shape characteristics of the fiber, a surface roughness is high, which causes damage to the electrolyte membrane, so that a fire may be caused resulted from an electrical short, or there may be a high risk of explosion resulted from a cross-movement of the oxygen/hydrogen. On the other hand, the sintered powder type has a relatively excellent performance as a contact area with the catalyst layer is large, and has a relatively low risk of damaging the electrolyte membrane as the surface roughness is low. However, the sintered powder type has disadvantages that, compared to the sintered fiber type, it is difficult to simultaneously increase the mechanical strength for securing a structural stability and maintaining a relatively high surface pressure, and a porosity for facilitating smooth diffusion/distribution of the reactant and discharge of a product.

Therefore, there is a demand for research and development on a material for a porous transport layer excellent in the corrosion resistance, the electrical conductivity, the distributivity and the diffusivity of the reactant, the surface roughness, the mechanical strength, and the like, and a method for preparing the same.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a material for a porous transport layer excellent in a corrosion resistance, an electrical conductivity, a distribution and a diffusivity of a reactant, a surface roughness, a mechanical strength, and the like, and a method for preparing the same.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a composite for a porous transport layer contains a particulate substrate containing at least one selected from a group consisting of an oxide of a first metal and a second metal, and nanoparticles of a third metal formed on a surface of the particulate substrate.

According to various aspects of the present invention, a porous sintered body includes a sintered body of the composite for the porous transport layer.

According to various aspects of the present invention, a porous transport layer contains the porous sintered body.

According to various aspects of the present invention, a method for preparing a composite for a porous transport layer includes (A) preparing a mixture by mixing a particulate substrate containing at least one selected from a group consisting of an oxide of a first metal and a second metal, and solution containing an ionic precursor of a third metal with each other, and (B) binding the ionic precursor of the third metal to a surface of the particulate substrate by chelating the ionic precursor of the third metal in the mixture.

According to various aspects of the present invention, a method for preparing a porous sintered body for a water electrolysis cell or a fuel cell includes forming the composite for the porous transport layer prepared by the method for preparing the composite for the porous transport layer, and then sintering the composite to prepare the sintered body.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
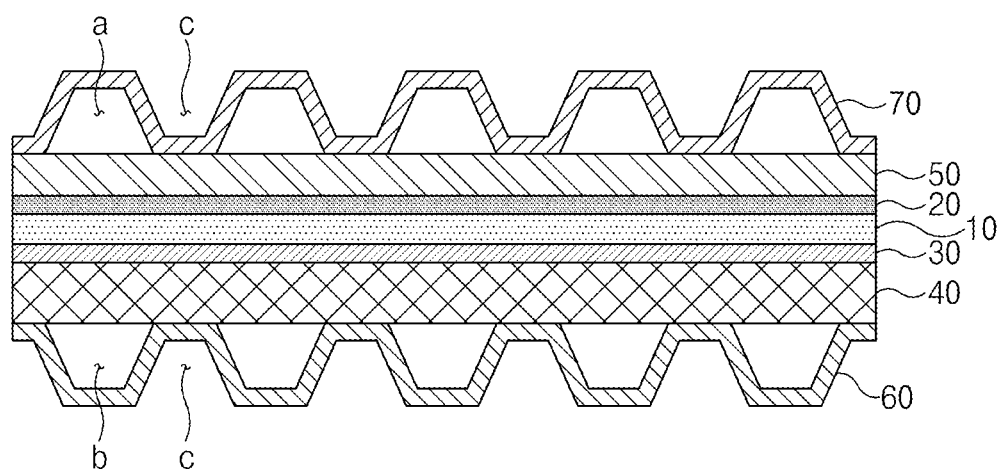
FIG. 1 is a cross-sectional view of a usual polymer electrolyte membrane (PEM) water electrolysis cell.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the exemplary embodiment, when a component "contains" a certain component, it means that other components may be further contained rather than excluding other components unless otherwise stated.

In the exemplary embodiment, when one member is positioned on a "surface" of another member, this includes not only a case where one member is in contact with another member, but also a case where another member exists between the two members.

Composite for Porous Transport Layer

A composite for a porous transport layer according to various exemplary embodiments of the present invention includes a particulate substrate; and nanoparticles formed on a surface of the particulate substrate.

Figure 2:
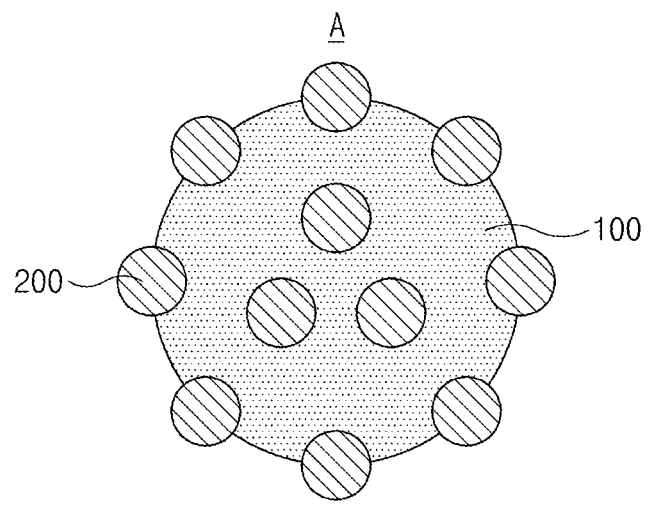
FIG. 2 is a schematic diagram of a composite for a porous transport layer according to various exemplary embodiments of the present invention.

Referring to FIG. 2, a composite "A" for a porous transport layer according to various exemplary embodiments of the present invention may include a particulate substrate 100 and nanoparticles 200 formed on a surface of the particulate substrate.

Particulate Substrate

The particulate substrate contains at least one selected from a group consisting of an oxide of a first metal and a second metal. The particulate substrate may contain the oxide of the first metal, the second metal, or a mixture of the oxide of the first metal and the second metal. When the particulate substrate contains the mixture of the oxide of the first metal and the second metal, the composite according to various exemplary embodiments of the present invention may contain a first composite containing the oxide of the first metal and nanoparticles of third metal formed on the oxide, and a second composite containing the second metal and the nanoparticles of the third metal formed on the second metal.

The oxide of the first metal may include an oxide of at least one metal selected from a group consisting of zirconium (Zr) and cerium (Ce), doped with at least one metal selected from a group consisting of scandium (Sc), yttrium (Y), and a lanthanide. In the present connection, the lanthanide may be, for example, cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Furthermore, the second metal may include at least one selected from a group consisting of titanium (Ti), zirconium (Zr), niobium (Nb), hafnium (Hf), tantalum (Ta), and tungsten (W).

The particulate substrate may have an average particle diameter of 20 μm to 50 μm. When the average particle diameter of the particulate substrate is less than the above range, it is not easy to form a pore structure because of an increase in a specific surface area when sintering of the composite. When the average particle diameter of the particulate substrate is greater than the above range, a surface roughness of a produced sintered body becomes excessively large, which may impair compatibility with adjacent parts.

Nanoparticles of Third Metal

The nanoparticles of the third metal are formed on the surface of the particulate substrate, and a frequency of an occurrence of necking between the nanoparticles on the surface of the particulate substrate increases during the sintering, so that the nanoparticles of the third metal serve as a role of improving a mechanical strength and an electrical conductivity of the produced sintered body.

The third metal may include at least one selected from a group consisting of titanium (Ti), zirconium (Zr), niobium (Nb), hafnium (Hf), tantalum (Ta), and tungsten (W).

Furthermore, the nanoparticles of the third metal may additionally include at least one precious metal selected from a group consisting of gold (Au), platinum (Pt), palladium (Pd), rhodium (Rh), ruthenium (Ru), and iridium (Ir).

The nanoparticles of the third metal may have an average particle diameter of 10 nm to 50 nm.

The composite for the porous transport layer may be used by being mixed with at least one additional metal selected from a group consisting of an oxide of a fourth metal and a fifth metal. In the present connection, the oxide of the fourth metal is as defined in the oxide of the first metal, and the fifth metal is as defined in the second metal.

The composite for the porous transport layer according to various exemplary embodiments of the present invention as described above is configured for being sintered even at a low temperature, preventing pore structure closure resulted from agglomeration of the particles, and a decrease in a porosity resulted therefrom.

Porous Sintered Body

A porous sintered body of the present invention includes the sintered body of the composite for the porous transport layer.

The sintered body may have an average pore diameter of 5 μm to 30 μm and an average porosity of 30% to 60%. The sintered body may have the average pore diameter of 8 to 20 μm and the average porosity of 35 to 55%. When the average pore diameter of the sintered body exceeds the above range, the surface roughness may be increased to cause surface damage of the adjacent parts. When the average pore diameter of the sintered body is less than the above range, the mechanical strength is low, which may lower the structural stability. Furthermore, when the average porosity of the sintered body exceeds the above range, the surface roughness may be increased to cause the surface damage of the adjacent parts. When the average porosity of the sintered body is less than the above range, distribution, diffusion, and removal of a reactant and a product are not easy, which may deteriorate a performance and an efficiency of a water electrolysis cell or a fuel cell.

Furthermore, the porous sintered body may be a mixture of the composite for the porous transport layer, and a sintered body of the at least one additional metal selected from the group consisting of the oxide of the fourth metal and the fifth metal. In the present connection, the oxide of the fourth metal is as defined in the oxide of the first metal, and the fifth metal is as defined in the second metal.

The sintered body as described above facilitates the distribution, the diffusion, and the removal of the reactant and the product by having pores of an appropriate average diameter and an appropriate porosity, and at the same time, has excellent mechanical strength and structural stability as the necking between the nanoparticles of the third metal is increased. Therefore, the sintered body may be suitably used as a porous transport layer for the water electrolysis cell or the fuel cell.

Porous Transport Layer and Water Electrolysis Cell or Fuel Cell Including the Same The porous transport layer of the present invention contains the porous sintered body. The porous transport layer may be composed of the porous sintered body.

Furthermore, the water electrolysis cell or the fuel cell of the present invention includes the porous transport layer.

Method for Preparing Composite for Porous Transport Layer

A method for preparing the composite for the porous transport layer according to various exemplary embodiments of the present invention includes: (A) preparing a mixture by mixing the particulate substrate with solution containing an ionic precursor of the third metal; and (B) binding the ionic precursor of the third metal to the surface of the particulate substrate.

(A) Preparing Mixture

In the present operation, the mixture is prepared by mixing the particulate substrate with the third metal ionic precursor-containing solution.

The particulate substrate and the third metal are as described in the composite for the porous transport layer.

The ionic precursor of the third metal may be a positive ionic precursor of the third metal. For example, the precursor of the third metal may be dissolved and contained in a cationic form in the ionic precursor-containing solution. In the present connection, the precursor of the third metal is not particularly limited as long as being able to be dissolved in a solvent and dissociate the third metal in the solvent. For example, the precursor of the third metal may be $(NH_4)_8[Ti_4(C_6H_4O_7)_4(O_2)_4] \cdot 8H_2O$.

The third metal ionic precursor-containing solution may contain at least one solvent selected from a group consisting of an alcohol-based organic solvent and water. In the present connection, the alcohol-based organic solvent may be, for example, ethanol, n-propanol, isopropanol, and the like, and the water may be, for example, deionized water.

In the mixture, a content of the oxide of the first metal may be 10 to 30% by volume in a volume fraction with respect to a total content of the oxide of the first metal, the second metal, and the nanoparticles of the third metal. When the content of the oxide of the first metal in the mixture is less than the above range, a sintering suppression effect is not able to be expected. When the content of the oxide of the first metal exceeds the above range, an electrical conductivity of the porous transport layer may be inhibited.

The mixture may be in a colloidal form.

(B) Binding Ionic Precursor of Third Metal to Surface of Particulate Substrate

In the present operation, the ionic precursor of the third metal in the mixture is chelated and bound to the surface of the particulate substrate.

In the present operation, the cationic precursor of the third metal is chelated and changed into an anionic complex compound of the third metal.

Charges on the surface of the particulate substrate are positively charged by lowering pH of the mixture to be equal to or below an isoelectric point of the particulate substrate.

The anionic complex compound of the third metal may be electrostatically bound to the surface of the particulate substrate which is positively charged.

In the present connection, the chelation may be performed using, for example, a chelating agent containing at least one selected from a group consisting of citric acid and ethylenediamine tetraacetic acid.

The pH adjustment of the mixture may be performed using an acid or a base, and for example, nitric acid, sulfuric acid, hydrochloric acid, aqueous ammonia, and the like. In the present connection, an amount of the acid and the base used may be adjusted based on types and characteristics of the particulate substrate.

The binding may be performed by stirring the ionic precursor of the third metal, and may be performed by stirring the ionic precursor of the third metal at 60 rpm to 360 rpm for 12 to 18 hours. When a stirring time is less than the above range, the binding may be insufficient or may not be uniform. When the stirring time exceeds the above range, the particulate substrate may be precipitated from the mixture, or a process time may be excessively increased, resulting in a decrease in an economic efficiency.

The preparation method may additionally include, after the operation (B) as described above, an operation forming the nanoparticles of the third metal on the surface of the particulate substrate by drying and heat-treating the particulate substrate having the surface to which the complex compound of the third metal is bound.

Forming Nanoparticles of Third Metal

The drying may be performed at a temperature at which the solvent in the third metal ionic precursor-containing solution may be vaporized.

The heat-treatment may be performed under at least one gas selected from a group consisting of hydrogen and an inert gas at 400° C. to 700° C. In the present connection, the inert gas may be, for example, argon (Ar) gas. Furthermore, the heat-treatment may be performed in a vacuum environment.

When the temperature during the heat-treatment is less than the above range, removal of the solvent and organic matter may not be sufficient. When the temperature exceeds the above range, coarsening of the nanoparticles of the third metal may proceed. Furthermore, when the heat-treatment is not performed in a presence of the hydrogen and/or the inert gas, that is, is not performed in a reducing atmosphere, it is not preferable because the prepared composite loses an electrical conductivity and is weakened in a mechanical strength as the nanoparticles of the third metal on the surface are oxidized.

Method for Preparing Mixture Containing Composite for Porous Transport Layer

Furthermore, various aspects of the present invention provide a method for preparing a mixture containing the composite for the porous transport layer.

The method for preparing the mixture includes mixing the composite prepared using the method as described above, and the at least one additional metal selected from the group consisting of the oxide of the fourth metal and the fifth metal.

In the present connection, the oxide of the fourth metal is as defined in the oxide of the first metal, and the fifth metal is as defined in the oxide of the second metal.

Furthermore, the mixing of the composite and the additional metal may be mixing the composite and solution containing the additional metal. In the present connection, the additional metal-containing solution may contain the solvent as described in the third metal ionic precursor-containing solution.

When mixing the composite and the additional metal with each other, a pore forming agent may be additionally added to further improve the porosity of the sintered body to be prepared. In the present connection, the pore forming agent may not be particularly limited as long as generally being able to be used in the preparation of the metal sintered body, and may be, for example, polymethyl methacrylate.

In addition, the mixing of the composite and the additional metal is not limited as long as it is a method that may be generally used when mixing two or more types of metals or metal oxides with each other. For example, a method such as a ball mill or the like may be used.

After being mixed with the additional metal, the composite may be dried to prepare a powder-type composite-additional metal mixture. In the present connection, the drying may be applied without particular limitation as long as it is under a condition capable of vaporizing the solvent in the additional metal-containing solution.

Method for Preparing Porous Sintered Body for Water Electrolysis Cell or Fuel Cell The method for preparing the porous sintered body of the present invention includes forming the composite for the porous transport layer prepared by the method for preparing the composite for the porous transport layer as described above, and then sintering the formed composite to prepare the sintered body.

The forming may not be particularly limited as long as it is performed using a method commonly used in the preparation of the porous sintered body for the water electrolysis cell or the fuel cell, and the method may be, for example, a pressure forming method, a tape casting method, and the like.

The sintering may be performed in a vacuum of equal to or less than $10^{-5}$ mbar and at 900° C. to 1,300° C. The sintering may be performed in a vacuum equal to or less than $10^{-5}$ mbar and at 1,000° C. to 1,200° C.

When the temperature during the sintering is less than the above range, a mechanical property of the prepared sintered body may be weakened. When the temperature exceeds the above range, there is a problem that some of the pores of the prepared sintered body are closed, and thus the prepared sintered body is not able to function as the porous sintered. However, the sintering temperature may be appropriately adjusted based on types and characteristics of the oxide of the first metal, the second metal, and the nanoparticles of the third metal.

Compared with the related art, the method for preparing the porous sintered body of the present invention as described above may secure the pore structure as the agglomeration of the metal particles resulted from interference of metal oxide particles during high-temperature sintering is prevented, and simultaneously secure the mechanical strength and the electrical conductivity as the necking between the metal nanoparticles formed on the surface of the composite for the porous transport layer is increased during the sintering at a temperature equal to or lower than 1,300° C., which is a relatively low temperature.

Hereinafter, the present invention will be described in more detail through Examples. However, such Examples are only for helping understanding of the present invention, and the scope of the present invention is not limited to such Examples in any sense.

EXAMPLES

Example 1. An Exemplary Embodiment of FIG. 3

Figure 3:
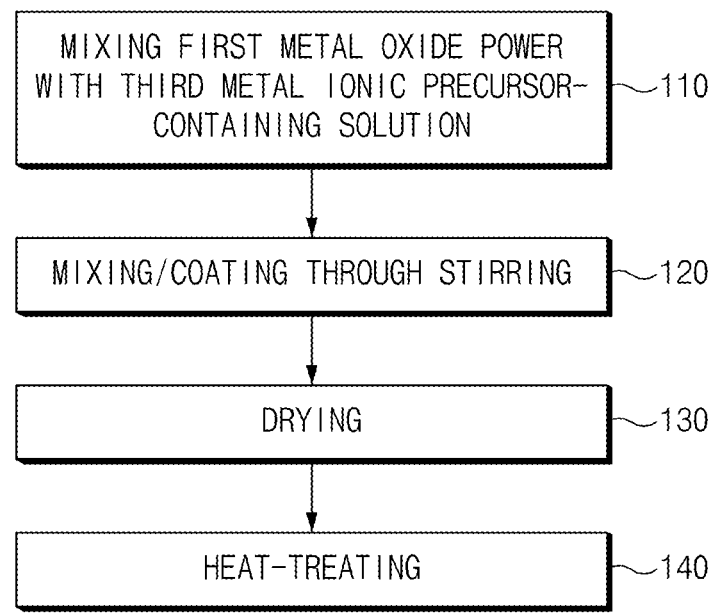
FIG. 3 is a flowchart of a method for preparing a composite for a porous transport layer in which nanoparticles of a third metal are formed on a surface of an oxide of a first metal according to various exemplary embodiments of the present invention.

The FIG. 3 includes steps 110, 120, 130 and 140.

A composite was prepared using an oxide ($Gd_{0.1}Ce_{0.9}O_{2-\delta}$) of cerium (Ce) doped with 10 atomic % gadolinium (Gd) as powder of the oxide of the first metal, and titanium (Ti) as the third metal. The oxide of the first metal was prepared such that a content thereof is 20% by volume in the volume fraction compared to a total content of the oxide of the first metal and the nanoparticles of the third metal, and the composite for the porous transport layer was prepared such that a total amount thereof is 10 g.

Specifically, 48.326 g of $(NH_4)_8[Ti_4(C_6H_4O_7)_4(O_2)_4]\cdot 8H_2O$, which is an ionic precursor of the titanium (Ti), was completely dissolved in the deionized water to prepare the third metal ionic precursor-containing solution.

Thereafter, 62.63 g of citric acid as the chelating agent was completely dissolved in the solution to chelate ions of the titanium (Ti) to be changed into anionic complex compound of the titanium (Ti). In the present connection, an amount of the deionized water was calculated to completely dissolve the ionic precursor of the titanium (Ti) and the chelating agent in consideration of solubility of the ionic precursor of the titanium (Ti) and the chelating agent for the deionized water. A mixed amount of the chelating agent was calculated such that the number of chelating agents is greater than the number of ions of the titanium (Ti) when the chelating agent is dissolved in the deionized water in which the ions of the titanium (Ti) are dissolved. For example, when the citric acid ($C_6H_8O_7$) is dissolved in the deionized water, the citric acid is dissociated into a form of $(C_6H_5O_7)^{3-}$. In the present connection, the number of $(C_6H_5O_7)^{3-}$ should be greater than the number of ions of the titanium (Ti). Most preferably, $(C_6H_5O_7)^{3-}$ was added such that the oxidation number of $(C_6H_5O_7)^{3-}$ is twice the oxidation number of ions of the titanium (Ti).

Thereafter, 2.86 g powder of the oxide of the cerium (Ce) doped with the gadolinium (Gd) was mixed into 500 ml of the solution containing the anionic (−) complex of the titanium (Ti). Accordingly, pH of the solution was lowered to be equal to or below an isoelectric point of the oxide to positively (+) charge a surface of the oxide, so that the anionic (−) complex of the titanium (Ti) was electrostatically bound to the positively (+) charged surface of the oxide. In the present connection, the pH adjustment was performed using nitric acid and aqueous ammonia. Furthermore, the binding was performed while stirring the anionic (−) complex of the titanium (Ti) at 180 rpm for 12 hours.

Thereafter, the oxide having the surface on which the anionic (−) complex of the titanium (Ti) was bound was heated to evaporate a solvent in the solution to be completely dried in a form of powder. Furthermore, at the same time when the powder was heat-treated at 600° C. under hydrogen gas to remove residual organic matter, nanoparticles of the titanium (Ti) were formed on the surface of the oxide of the first metal to prepare 10 g of a composite for a porous transport layer.

Example 2. An Exemplary Embodiment of FIG. 4

Figure 4:
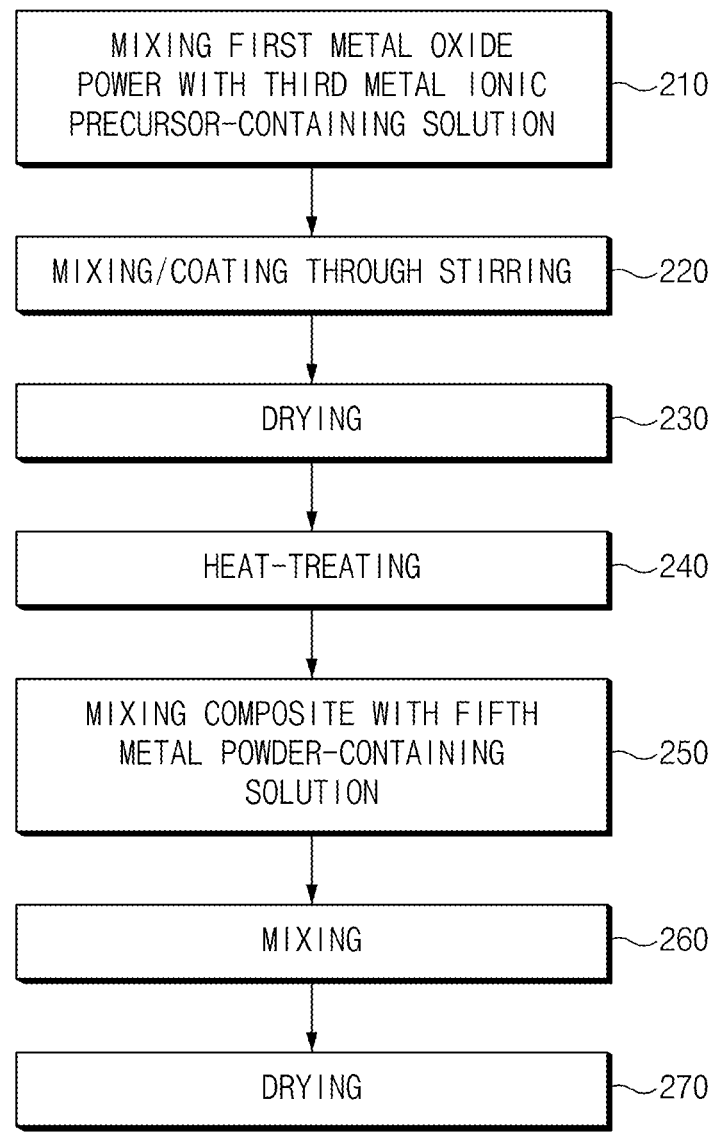
FIG. 4 is a flowchart of a method for preparing a composite for a porous transport layer in which nanoparticles of a third metal are formed on a surface of an oxide of a first metal and to which a fifth metal is mixed, according to various exemplary embodiments of the present invention.

The FIG. 4 includes steps 210, 220, 230, 240, 250, 260 and 270.

The titanium (Ti) was used as the fifth metal, and a composite was prepared in the same manner as in Example 1. However, to prepare the composite such that volume fractions of the oxide of the first metal, the nanoparticles of the third metal, and the fifth metal are 20% by volume, 60% by volume, and 20% by volume, respectively, 36.244 g of $(NH_4)_8[Ti_4(C_6H_4O_7)_4(O_2)_4]\cdot 8H_2O$, which is the ionic precursor of the titanium (Ti), 2.86 g powder of the oxide of the cerium (Ce) doped with the gadolinium (Gd), and 47.15 g of the citric acid, which is the chelating agent, were used to prepare the composite of a total amount of 8.215 g.

The composite 8.215 g and the titanium 1.785 g were put into the deionized water and ball-milled for 24 hours. Thereafter, the deionized water was heated and stirred to be evaporated and completely dried to be in a form of powder to prepare 10 g of a mixture containing a composite for a porous transport layer.

Example 3. An Exemplary Embodiment of FIG. 5

Figure 5:
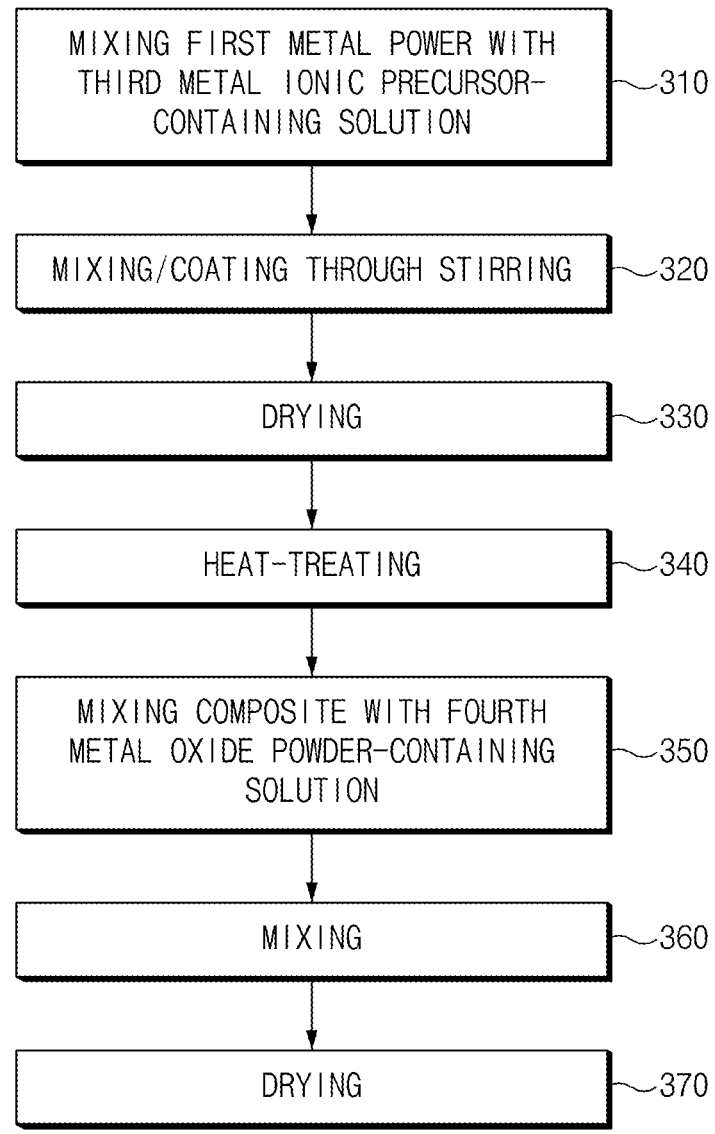
FIG. 5 is a flowchart of a method for preparing a composite for a porous transport layer in which nanoparticles of a third metal are formed on a surface of a second metal and to which an oxide of a fourth metal is mixed, according to various exemplary embodiments of the present invention.

The FIG. 5 includes steps 310, 320, 330, 340, 350, 360 and 370.

A composite was prepared in the same manner as in Example 1, except that the titanium (Ti) was used as the second metal powder instead of the powder of the oxide of the first metal. Furthermore, a mixture was prepared in the same manner as in Example 2, except that the oxide of the cerium (Ce) doped with the gadolinium (Gd) was used as the oxide of the fourth metal instead of the fifth metal of Example 2.

However, to prepare a composite such that volume fractions of the oxide of the fourth metal, the nanoparticles of the third metal, and the second metal are 20% by volume, 60% by volume, and 20% by volume, respectively, 36.244 g of $(NH_4)_8[Ti_4(C_6H_4O_7)_4(O_2)_4]\cdot 8H_2O$, which is the ionic precursor of titanium the (Ti), 1.785 g of titanium (Ti) metal powder, and 47.15 g of the chelating agent citric acid were used to prepare the composite of a total amount of 7.14 g.

Thereafter, 7.14 g of the composite and 2.86 g of the oxide of the cerium (Ce) doped with the gadolinium (Gd), which is the oxide of the fourth metal, were put into the deionized water and ball-milled for 24 hours. Thereafter, the deionized water was heated and stirred to be evaporated and completely dried to be in a form of powder to prepare 10 g of the mixture containing the composite for the porous transport layer.

Example 4. An Exemplary Embodiment of FIG. 6

Figure 6:
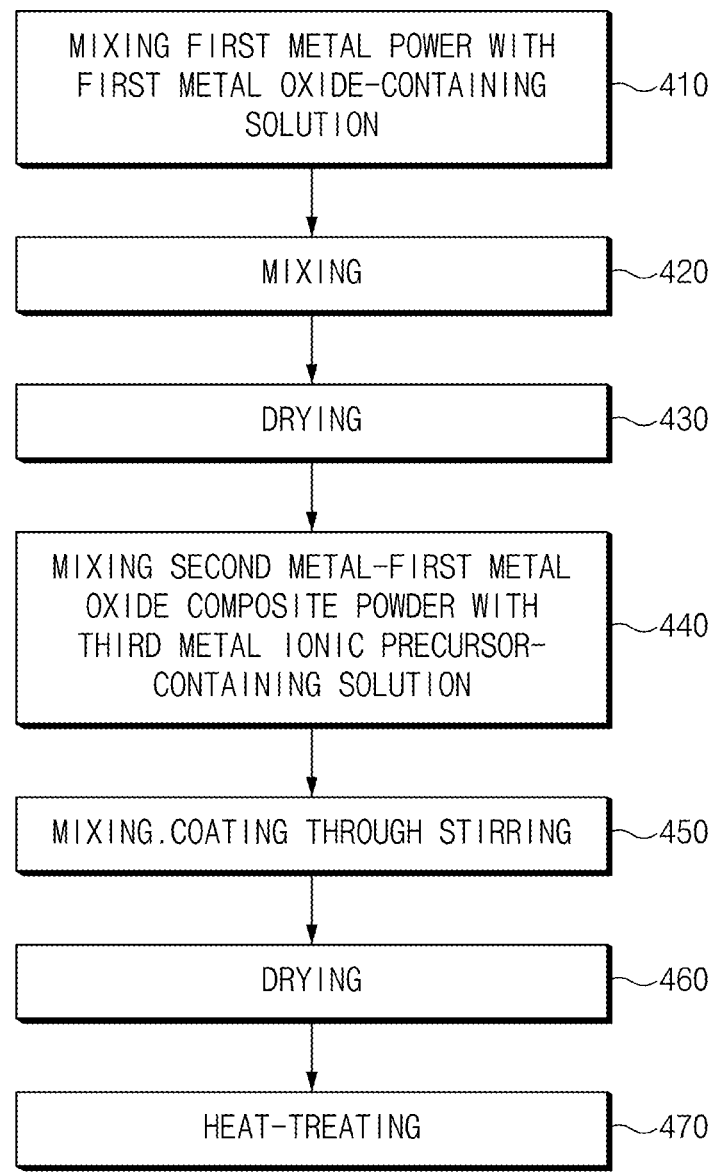
FIG. 6 is a flowchart of a method for preparing a composite for a porous transport layer in which nanoparticles of a third metal are formed in a mixture of an oxide of a first metal and a second metal according to various exemplary embodiments of the present invention.

The FIG. 6 includes steps 410, 420, 430, 440, 450, 460 and 470.

1.785 g of titanium as the second metal and 2.86 g of the oxide of the cerium (Ce) doped with the gadolinium (Gd) as the oxide of the first metal were put into the deionized water and mixed with each other, and accordingly, ball-milled for 24 hours. Thereafter, the deionized water was heated and stirred to be evaporated and completely dried to be in a form of powder to prepare mixture powder of the second metal-the oxide of the first metal.

The composite was prepared in the same manner as in Example 1, except that the mixture powder was used instead of the oxide of the first metal. However, to prepare a composite such that volume fractions of the oxide of the first metal, the nanoparticles of the third metal, and the second metal are 20% by volume, 60% by volume, and 20% by volume, respectively, 36.244 g of $(NH_4)_8[Ti_4(C_6H_4O_7)_4(O_2)_4]\cdot 8H_2O$, which is the ionic precursor of titanium the (Ti) and 47.15 g of the chelating agent citric acid were used to prepare the composite of a total amount of 10 g.

Comparative Example 1

The composite was formed in the pressure forming method using the titanium (Ti) powder, and then sintered under a vacuum of equal to or less than $10^{-5}$ mbar and at a temperature of 1,300° C. to prepare a sintered body.

Comparative Example 2

A sintered body was prepared in the same manner as in Comparative Example 1, except that the sintering was performed at a temperature of 1,000° C.

Experimental Example 1

Figure 7:
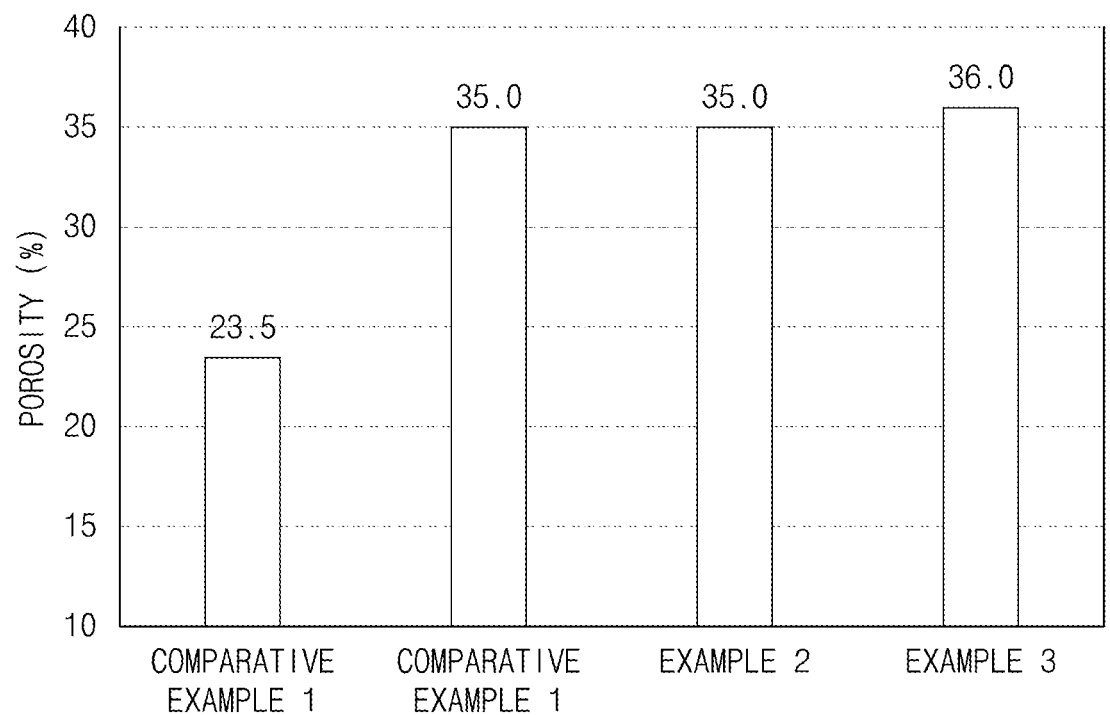
FIG. 7, FIG. 8 and FIG. 9 are porosities, pore size distributions, and SEM photographs measured and taken in Experimental Example of the present invention.
Figure 8:
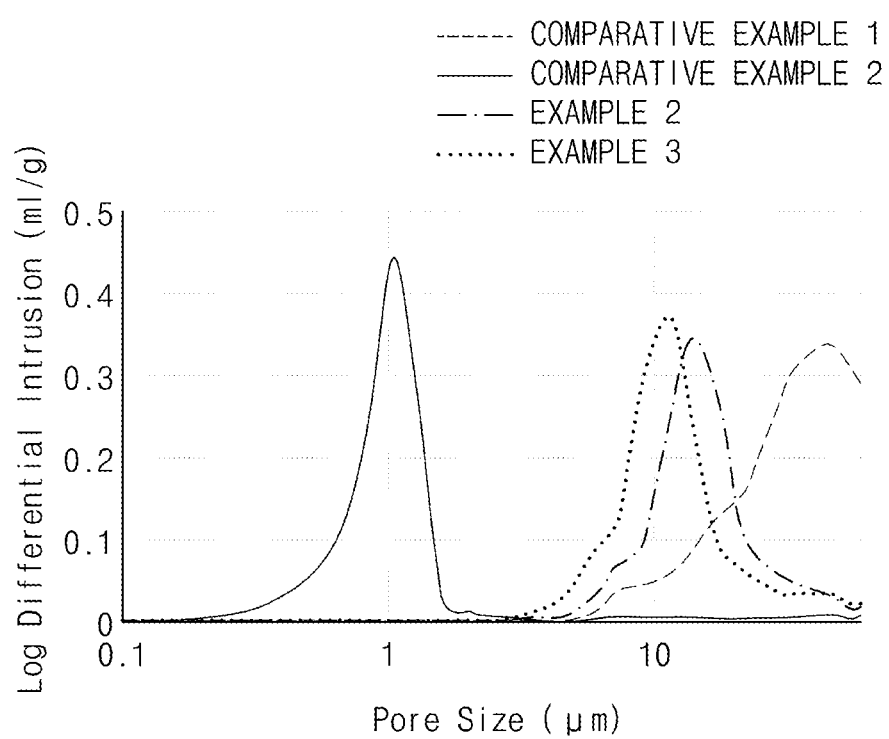
Figure 9:
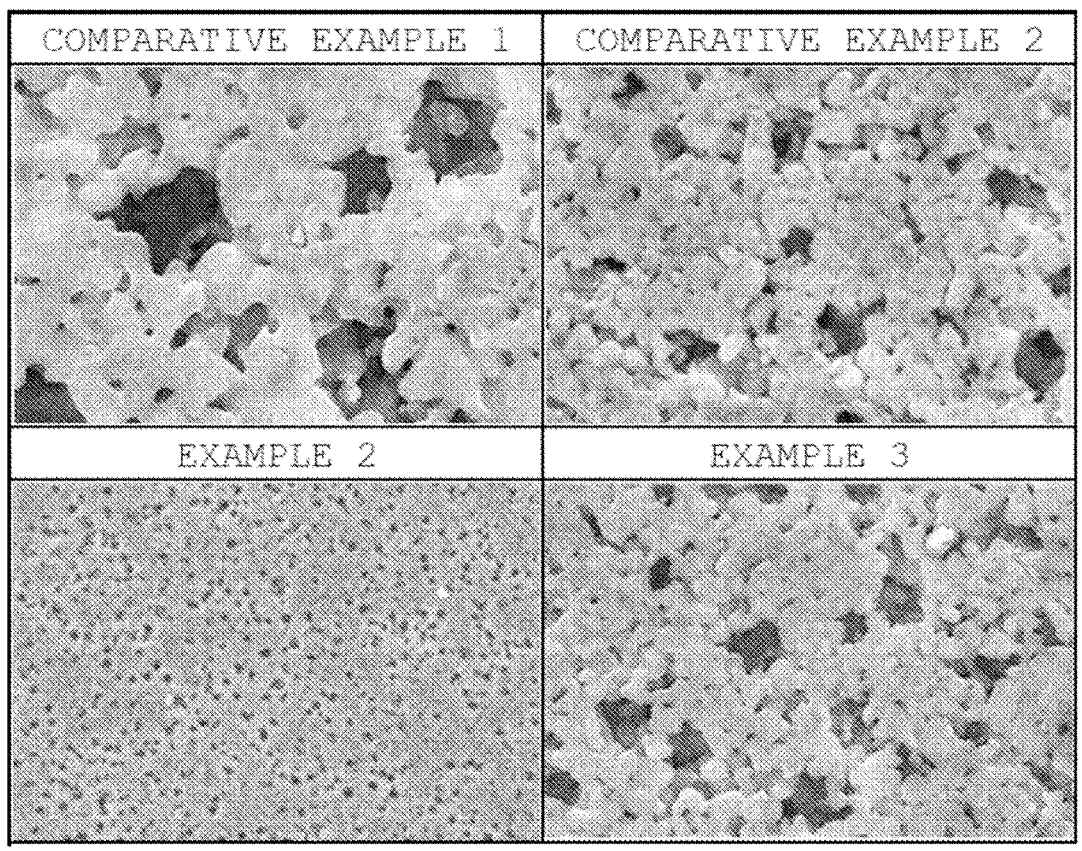

For the composites of Examples 2 and 3, and the sintered bodies of Comparative Examples 1 and 2, porosities and pore size distributions were measured, and SEM photographs were taken, and results thereof are shown in FIGS. 7 to 9.

The porosity and the pore size distribution were measured using mercury porosimetry. Furthermore, FIG. 7 is a porosity measurement result, FIG. 8 is a pore size distribution measurement result, and FIG. 9 shows SEM photographs.

As shown in FIG. 7, Comparative Example 1, in which the sintering temperature was raised to increase the mechanical strength, had problems in that the pore structure is closed because of the agglomeration between the metal particles, the porosity was lowered, and a pore size is relatively large.

Furthermore, Comparative Example 2, in which the sintering temperature was lowered to increase the porosity, secured the porosity, but had a problem in that the mechanical strength is weakened because of a decrease in the pore size resulted from a decrease in the necking.

On the other hand, it was found that the composites of Examples 2 and 3 secure the porosity and increase the mechanical strength as the necking becomes active.

The composite for the porous transport layer according to various exemplary embodiments of the present invention may be sintered even at the low temperature, preventing the pore structure closure resulted from the agglomeration between the particles, and thus, preventing the decrease in the porosity and an increase in the average pore diameter resulted therefrom. For the present reason, the sintered body of the composite for the porous transport layer facilitates the distribution, the diffusion, and the removal of the reactant and the product by having the pores of the appropriate average diameter and the appropriate porosity, and at the same time, has the excellent mechanical strength and structural stability as the necking between the nanoparticles of the third metal is increased. Therefore, the sintered body of the composite may be suitably used as the porous transport layer for the water electrolysis cell or the fuel cell.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A porous transport layer comprising a porous sintered body, wherein the porous sintered body comprises a sintered body of a composite for the porous transport layer,
    wherein the composite for the porous transport layer contains:
        a particulate substrate containing at least one selected from a group consisting of an oxide of a first metal and a second metal;
        nanoparticles of a third metal formed on a surface of the particulate substrate,
    wherein the particulate substrate has an average particle diameter of 20 μm to 50 μm,
    wherein the nanoparticles of the third metal have an average particle diameter of 10 nm to 50 nm,
    wherein the particulate substrate and the nanoparticles of a third metal are bound,
    wherein the sintered body of the composite for the porous transport layer comprises necking between the nanoparticles,
    wherein the nanoparticles do not form a separate layer,
    wherein the oxide of the first metal includes cerium (Ce) doped with at least one metal selected from a group consisting of scandium (Sc), yttrium (Y), and a lanthanide, and
    wherein each of the second metal and the third metal independently include titanium (Ti).

2. The porous transport layer of claim 1, wherein the sintered body has an average pore diameter of 5 μm to 30 μm and an average porosity of 30% to 60%.

3. A water electrolysis cell or fuel cell comprising the porous transport layer of claim 1.

* * * * *